March 5, 1968     O. ROTUNDA     3,372,286

SPRINKLER SYSTEM CONTROL APPARATUS

Filed Aug. 20, 1964     2 Sheets-Sheet 1

INVENTOR.
ORLO ROTUNDA
BY
Van Valkenburg & Fields
ATTORNEYS

March 5, 1968 — O. ROTUNDA — 3,372,286
SPRINKLER SYSTEM CONTROL APPARATUS
Filed Aug. 20, 1964 — 2 Sheets-Sheet 2

INVENTOR.
ORLO ROTUNDA
BY
Van Valkenburgh & Fields
ATTORNEYS

United States Patent Office 3,372,286
Patented Mar. 5, 1968

3,372,286
SPRINKLER SYSTEM CONTROL APPARATUS
Orlo Rotunda, 1720 9th St., Greeley, Colo. 80631
Filed Aug. 20, 1964, Ser. No. 390,846
8 Claims. (Cl. 307—141.4)

ABSTRACT OF THE DISCLOSURE

The subject matter is an automatic sequence control for a multi-bank lawn sprinkling system or the like, having a plurality of electrical actuators, such as solenoid valves. The sequence control includes two stepper relay switches adapted to operate in unison. The circuit extending from the first step of the first stepper relay is a starter circuit which includes a normally open switch adapted to be momentarily closed by a clock mechanism at selected time intervals, such as 24 hours. Circuits extend from the other contacts of this first stepper relay to the solenoid valves. The final step of the sequence on this first stepper relay includes a circuit to return the stepper arm to its initial position.

The starter circuit is adapted to swing the arm of each stepper from its first step contact to the next step in sequence and a pulser circuit is adapted to thereafter swing each arm from one step contact to the next. This pulser circuit includes a tube which functions as an electronic gate and flow of current is prevented in this circuit as long as there is a charge upon the grid of this tube. A timer circuit connects with this tube grid and includes a capacitor adapted to hold a charge on the grid. The charging and discharging of this capacitor operates the pulser circuit. A first charging circuit connects with the first step of the second relay to charge the capacitor at the initiation of the operation of the control. A second charging circuit, including a normally open relay switch, is connected with the timer circuit and is actuated by the relay solenoid in the pulser circuit to close the switch and charge the capacitor whenever a current is flowing in the pulser circuit and when the stepper arms are stepping.

Resistor leads connect with the subsequent contacts of the second relay and each circuit formed through this relay, as the arm of the relay moves from one contact to the next, is adapted to short the timer circuit to discharge the capacitor. However, the resistance in each lead permits only a slow leakage of current from the capacitor, sufficient to establish a selected time interval before the capacitor is discharged and current may again flow through the pulser circuit.

Additional features of this apparatus may include a manual switch for starting and stopping the apparatus at will. Such feaure may also include a third stepper type control adapted to shift one step once for each complete cyclic operation of the first two steppers with the leads of this third stepper interposed in the electrical auctuator leads, to allow or prevent operation of the electrical actuators during a cycle of operation of the sequence control, such, for example, as on alternate days.

---

This invention relates to control apparatus for water distribution systems, and more particularly to a control apparatus for an underground lawn sprinkliing system incorporating a plurality of individually operable branch lines. In certain respects, this invention is an improvement in the lawn sprinkling system of my U.S. Patent No. 3,118,606.

As described in the above patent, in the arid areas of the country, particularly in the western part of the United States, a scarcity of water has brought about special restrictive measures and regulations for watering of lawns to insure equitable and efficient use of the available water.

The best times for lawn watering are daybreak and in the evening, so that many communities restrict watering to these hours of the day. Also, lawn watering is often restricted to alternate days or to a selected pattern of alternate days, to permit different residents in different sections of a community to alternatively use the full amount of water and full water pressure available. Such a watering schedule is often inconvenient for many persons, since the watering hours are usually in the very early morning or in the early evening. Most sprinkling systems also include a number of branch lines, which with the water pressure usually available cannot all be operated at once but must be operated individually in sequence. Since the number of branch lines will vary from one installation to another, an adequate control should be capable of being adjusted to cause each branch line to operate for a selected period of time, so that all of the branch lines may be accommodated in the time within which watering is permitted. In addition, even in areas in which watering time is not controlled, to prevent waste of water or undue expense, it is desirable to water during the best times therefor and to control the length of time each branch line is in operation. Thus, there is a definite need for a control which will automatically cause a sprinkling system to operate for selected lengths of time, as well as on selected alternating days.

Some objects of this invention are: to provide a novel regulating control apparatus for a multiple branch lawn sprinkling system; to provide such an apparatus which automatically operates several branch lines at selected times, with each branch operating for a selected period of time; to provide such a system which may be quickly and easily adjusted to sequentially operate the individual branch lines according to any selected daily schedule and any selected alternating sequence of days of operation, either as alternating days, selected days of the week or selected days of the month; to provide such a system in which each branch line is timed by the discharging rate of a capacitor connected in circuit with a variable resistor which may be adjusted to alter the discharging time of the capacitor; to provide such an apparatus in which each branch line is timed without the use of a clock, thereby reducing the cost of the system; to provide such an apparatus which will continue to operate automatically according to a selected repeating schedule of definite periods and may be easily disrupted and reset whenever it is desirable to intercede in the automatic operation and operate the sprinkling system manually; to provide such a system having a manually operable cycling switch to set the cycle; to provide such a system in which certain parts, such as a reset solenoid and a stepper switch solenoid, operate together, so that a new timing cycle will start each time the cycling switch returns to its initial position; and to provide such an apparatus which will provide low cost operation, is relatively simple in construction and will operate for a long period of time with a minimum of maintenance and attention.

Additional objects and the novel features of this invention will become apparent from the description which follows, taken in conjunction with the accompanying drawings, in which.

Figure 1:
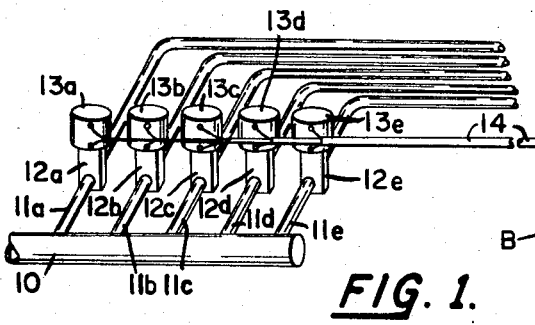
FIG. 1 is a diagrammatic, fragmentary, perspective view of a sprinkling system utilizing a control apparatus of this invention, showing the control panel on a larger scale and in plan view.

As shown in FIG. 1, water is supplied from a main water supply pipe 10 to a plurality of branch lines, such as branch lines 11a, 11b, 11c, 11d and 11e, in a watering system adapted to be controlled by the apparatus of this invention. Although only a portion of each branch line is shown in FIG. 1, it will be understood that each branch line extends under a selected portion of the lawn area to be sprinkled, so that each area may be watered at a separate time from each other area. The branch lines are respectively controlled by valves 12a, 12b, 12c, 12d and 12e. Normally each of valves 12a to 12e is closed, but opened upon energization of solenoids 13a, 13b, 13c, 13d and 13e, respectively, so that water is supplied to the respective branch line. The solenoids are operated from a control box B, whose circuitry will be discussed below in connection with FIGS. 3 and 4, and is operatively connected to the solenoids by wires extending through a conduit 14, which may be made of lead or other moisture impervious material, so that it can be laid in the same trench as the main or a branch pipe when the system is installed, to avoid the necessity of digging additional trenches for the electrical wiring. Of course, conduit 14 must be impervious to moisture, so that electrical wiring will not be shorted or otherwise damaged by moisture in the ground. Although only five branch lines and corresponding solenoids and valves have been shown, it will be understood that any greater or lesser number may be used, as desired or needed for the installation involved. While the discusion which follows below will assume an installation in which five branch lines are utilized, it will be understood that the number may be increased or decreased without departing from this invention.

As in FIG. 1, the control box B is provided with five rheostats 15, 16, 17, 18 and 19, which are provided with indicia indicating time periods, as from 0 to 60 minutes, and are respectively electrically connected to solenoids 13a to 13e, respectively. In accordance with this invention, the rheostats operate individualy in conjunction with a capacitor 20 and a transistor or vacuum tube 21 of FIG. 3. Rheostat 15 is provided with a variable resistor 22a, on which the movable contact of the rheostat may be set for the time period desired, the movable contact being in series with a resistor 23a. Rheostats 16, 17, 18 and 19 include similar variable resistors 22b, 22c, 22d and 22e, respectively, and similar resistors 23b, 23c, 23d and 23e, respectively. By setting a rheostat for a particular time period, that solenoid to which the rheostat is connected will be operative for that period of time, as will be more fully understood from the more detailed discussion of FIG. 3 below. In general, capacitor 20 will be discharged through rheostat 15, the time necessary to discharge the capacitor being determined by the setting of the movable tap of the rheostat along resistor 22a, while the time for discharge of capacitor 20, when controlled by one of the other rheostats, will similarly be determined by the setting of the movable tap of the respective rheostat 16, 17, 18 or 19 along variable resistor 22b, 22c, 22d or 22e. As shown in FIG. 1, rheostat 15 is set for a cycle of 10 minutes, rheostat 16 for 40 minutes, rheostat 17 for 30 minutes, rheostat 18 for 0 minutes and rheostat 19 for 30 minutes, although each could be set for other time periods, or all for the same time period, if desired.

Figure 3:
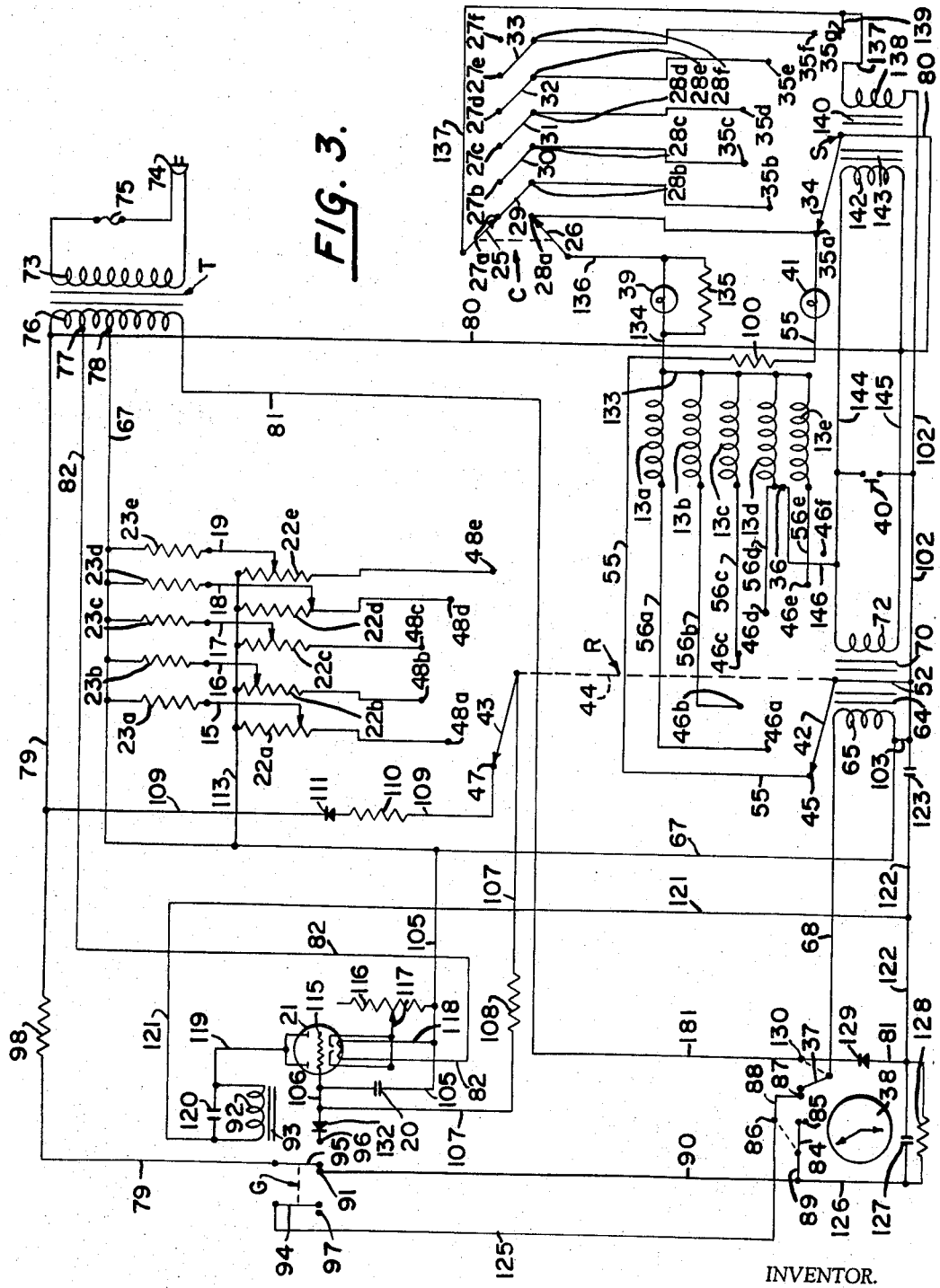
FIG. 3 is a circuit diagram of the control mechanism of this apparatus, with a reset switch set for daily cycling.

In further accordance with this invention, a cycling switch C of FIG. 3 is set by a switch control 24 on box B for selecting the number of days between cycles. The switch shown is adjustable for a maximum cycle period of six days, but could be provided with additional stations for a longer cycling period, if desired. Cycling switch C is provided with a pair of ganged arms 25 and 26 which are moved together and are conveniently moved in an arcuate path, the indication in FIG. 3 of linear movement being primarily for purposes of illustration. Switch also includes two decks or rows of contacts, including a first row of contacts 27a, 27b, 27c, 27d, 27e and 27f and a second row of contacts 28a, 28b, 28c, 28d, 28e and 28f, which are adapted to be sequentially engaged by the respective arms 25 and 26. Contact 27a is connected to contact 28b by a cross wire 29; contact 27b is connected to contact 28c by a cross wire 30; contact 27c is connected to contact 28d by a cross wire 31; contact 27d is connected to contact 28e by a cross wire 32; and contact 27e is connected to contact 28f by a cross wire 33. The cycling switch C operates in conjunction with a stepper switch S having a sweep arm 34 adapted to engage sequentially a series of contacts 35a, 35b, 35c, 35e and 35f which are connected to the respective contacts 28a, 28b, 28c, 28d, 28e and 28f of switch C, as shown, as well as a contact 35g.

A reset switch 36 is provided on box B for selecting the number of branch lines that will be activated during a particular operation. Thus, any number of branch lines can be operated during a cycle from one up to the maximum number of lines in the system, such as three, as illustrated in FIGS. 1 and 3. A manual push button 37 is provided, which may be used to start the cycle at some time other than that determined by a timer or clock 38 of FIG. 3 (lower left corner) and the operation of the cycle is indicated by a light 39 which will vary in brightness, as described below, depending on whether or not the system is operating properly. A reset button 40 is also provided, which may be used to reset the apparatus for beginning a new cycle, even though the old cycle may not have been completed. A light 41 is provided to indicate when the cycle has been reset, either automatically or manually.

Figure 2:
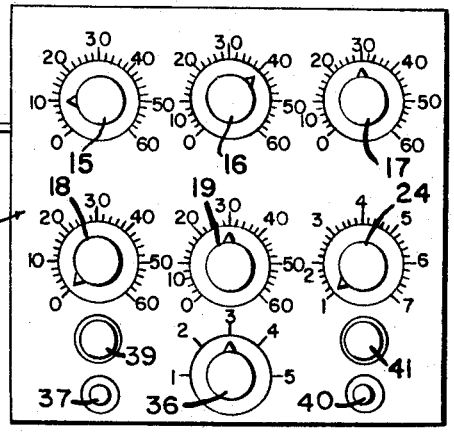
FIG. 2 is a fragmentary perspective view of a stepper switch and timing deck of the apparatus of this invention.
Figure 2:
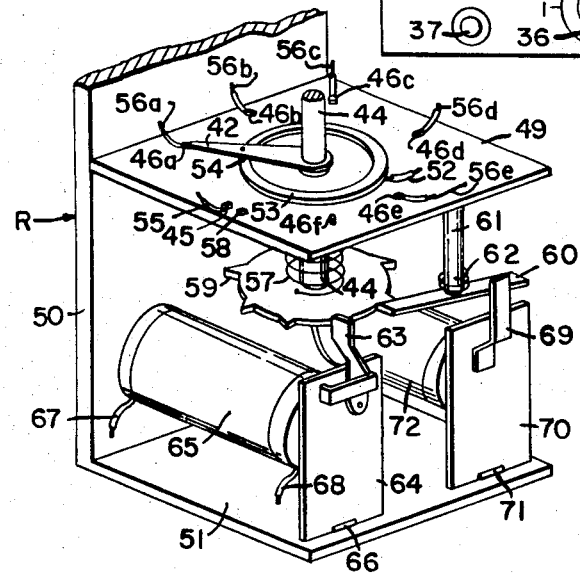

To effect sequential operation of the solenoid valves 13a to 13e, a stepper relay R is provided, which may be similar in construction to the stepper relays of my Patent No. 3,118,606 and which has a pair of sweep arms 42 and 43, mounted on a common shaft 44, as in FIG. 3. Although only sweep arm 42 is shown in FIG. 2, it will be understood that sweep arm 43 is constructed in a similar manner and operates simultaneously with sweep arm 42. In general, sweep arm 42 is adapted to rotate so as to sequentially engage a plurality of circumferentially spaced contacts 45, 46a, 46b, 46c, 46d, 46e and 46f, while sweep arm 43 is similarly adapted to sequentially engage contacts 47, 48a, 48b, 48c, 48d and 48e, respectively, as in FIG. 3. Contacts 48a, 48b, 48c, 48d and 48e are respectively connected to wire wound resistors 22a, 22b, 22c, 22d and 22e of the rheostats, as shown. As in FIG. 2, sweep arm 42 is mounted above a plate 49 attached to a rear wall 50 of relay R, as by welding, while a bottom rectangular support 51 may be formed integrally therewith, as shown, or may also be welded to back wall 50. A similar plate is provided below sweep arm 43 and may be formed integrally with or attached to rear wall 50. Conveniently, an input wire 52 is connected to sweep arm 42, as through an insulated contact ring 53 mounted on plate 49 and engaged by a pin 54 depending from arm 42, to permit current to flow to the respective contacts 46a to 46f when engaged by arm 42. A wire 55 extends from contact 45 to stepper switch S of FIG. 3, as will be described below, while leads 56a, 56b, 56c, 56d and 56e extend from their respective contacts to solenoids 13a to 13e, respectively, as in FIG. 3. Shaft 44, on which sweep arm 42 and sweep arm 43 are mounted, is resiliently torsioned by a spring 57, as in FIG. 2, to rotate the arm to a selected return position, such as against a stop 58 and resting on contact 45, whenever the arm is released from any other position of rotation.

Arms 42 and 43 are moved from one contact to the next through a ratchet drive arrangement, as in FIG. 2, which includes a directional sprocket 59 mounted on the lower end of shaft 44 and having the pitch of its teeth corresponding to the spacing of the contacts. A lock detent bar 60 is mounted for rotation on the lower end of a pin 61, extending downwardly from the bottom of plate 49, and is resiliently torsioned by a coil spring 62, so that the end of detent bar 60 may engage the sprocket teeth to lock and hold sprocket 59, as well as shaft 44 and sweep arms 42 and 43, against rotational movement by spring 57. A driving arm 63, which is attached to the armature 64 of a drive solenoid 65, is adapted to advance sprocket 59 when armature 64 is pivoted about a hinge 66, which connects it to support 51, when drive solenoid 65 is activated. This causes the sprocket to be advanced in a clockwise direction. As can easily be seen, detent bar 60 will ride over one tooth and engage the next tooth, so as to hold the sprocket in advanced position upon the energization of solenoid 65, through lead 67 and wire 68. Conveniently, armature 64 is spring urged, so as to move back to a vertical position in which driving arm 63 does not engage the sprocket, after the drive solenoid 65 has been deenergized.

A release arm 69 extends from an armature 70, which is pivoted to base 51 by a hinge 71 and which will be pivoted when a release solenoid 72 is energized, so as to engage the outer end of lock detent bar 60, causing it to pivot in a counterclockwise direction about pin 61, so that ratchet 59 may rotate in a counterclockwise direction, under the influence of torsion spring 57, so as to return sweep arms 42 and 43 to their initial starting positions on contacts 45 and 47, respectively. As in FIG. 3, the control box B is powered by a transformer T having a primary winding 73 which is connected to a conventional wall plug 74, which may be plugged into any suitable source of 110 volt A.C. current. Advantageously, a fuse 75 is interposed in one line to plug 74, to prevent overloading. The secondary winding 76 of transformer T also carries 110 volts, but is provided with two center taps 77 and 78, which provide 12 volt and 24 volt power supplies, respectively. Leads 79 and 80 are connected to the end of the transformer secondary coil adjacent center tap 77, while a lead 81 is connected to the opposite end of the secondary coil and a lead 82 to centertap 77, with lead 67 to solenoid coil 65 being connected to center tap 78, each for a purpose described below. In general, the potential between leads 79 or 80 and lead 81 is 110 volts, between leads 67 and 79 is 24 volts, and between leads 79 and 82, as well as between leads 67 and 82, is 12 volts.

The clock or timer 38 of FIG. 3 is provided within control box B and is of a conventional type, which may be set so as to operate the sprinkler system at a particular time each day or at several particular times each day. The clock mechanism is operatively connected to a switch 84, which normally rests against a stop 85, but causes switch 84 to engage a contact 86 at a preset time each day, as by a tab, which completes the circuit for drive solenoid 65, so as to advance relay R. One side of drive solenoid 65 is connected to center tap 78 through lead 67, as indicated, while the other side is connected to the adjacent end of secondary winding 76 through wire 68, switch 37, a contact 87, a wire 88, contact 86, switch 84 when closed in the dotted position shown, a wire 89 and a wire 90 which is connected to a contact 91 of a double pole, double throw gang switch G. The latter is operated by a solenoid 92 having an armature 93 and is provided with a pair of arms 94 and 95, arm 95 normally engages contact 91 but movable into engagement with a contact 96, for a purpose described below, and arm 94 normally engages a stop 97 but movable into engagement with contact 91, also for a purpose described below. With arm 95 in engagement with contact 91, as shown in FIG. 3, wire 90 is connected with lead 79, connected to the end of transformer secondary winding 76 and having a dropping resistor 98 interposed therein. It will be noted that, before drive solenoid 65 is energized initially, sweep arm 42 rests on contact 45, which is connected by wire 55, in which a dropping resistor 100 is interposed in series with indicating light 41 to contact 35a of stepper switch S, while sweep arm 34 rests on contact 35a and is connected to secondary coil 76 by lead 80. The other side of this circuit is completed to lead 67 and secondary center tap 78 from sweep arm 42 of relay R, through wire 52, a portion of a wire 102 and a transfer wire 103. Thus, when relay R and stepper switch S are in their initial positions, light 41 will be illuminated to indicate this setting.

In this initial position, capacitor 20 also will be charged through sweep arm 43 and maintained in this charged condition, being in a circuit comprising center tap 78, a portion of lead 67, a wire 105 in which the capacitor 20 is interposed, a wire 106 and a wire 107 in which a dropping resistor 108 is interposed, the opposite end of wire 107 being connected to sweep arm 43, which is in engagement with contact 47. The circuit then is completed from contact 47 through a wire 109, having a resistor 110 and a rectifier 111 interposed in series therein, and a portion of lead 79 to secondary winding 76. However, upon the energization of drive solenoid 65, sweep arm 42 will move to contact 46a, causing solenoid 13a to be energized and the water to line 11a of FIG. 1 to be turned on, while sweep arm 43 will be advanced to contact 48a, which is connected to wire wound variable resistor 22a forming part of rheostat 15, as indicated. The opposite end of resistor 22a, as well as the corresponding ends of resistors 22b to 22e, are connected by a wire 113 with lead 67, while resistor 23a as well as resistors 23b to 23e are directly connected to lead 67, at the ends opposite the variable tap of the respective rheostat.

The vacuum tube 21, such as a 12AU7, for which a suitable transistor may be substituted, has a screen grid 115 to which wire 106 is connected. The cathodes are connected to a variable resistor 116 through a movable tap 117, one end of the variable resistor being connected to wire 105. Thus, the voltage across the tube may be varied so that the potential at which the tube will fire may be set, as at the factory. One side of the twin heaters of tube 21 is connected by lead 82 to the 12 volt center tap 77 of transformer T, while the opposite side thereof is connected by a wire 118 to wire 105, in turn connected by lead 67 with center tap 78. A pair of anodes are connected by a wire 119 to solenoid 92, across which is a capacitor 120 having a capacity sufficient to provide a time delay characteristic for holding the contacts of gang switch G in position to charge capacitor 20 to its maximum value. The anodes are further connected by a wire 121 to a portion of a wire 122, for connection through lead 81 to secondary coil 76, while a capacitor 123 is interposed between wire 122 and wire 102, for a purpose described below.

When solenoid 65 is energized, thereby advancing the sweep arms so that sweep arm 43 engages contact 48a the capacitor 20 will begin discharging at a rate determined by the setting of rheostat 15, allowing the negative bias on grid 115 to decrease. The capacitor discharges through the path comprising wires 106 and 107, resistor 108, sweep arm 43, contact 48a, a portion of wire wound resistor 22a and resistor 23a of rheostat 15 to lead 67, which is connected by wire 105 to the other side of the capacitor. When capacitor 20 is discharged to the point that the bias of screen grid 115 is very nearly zero, electron flow in tube 21 between the cathodes and anodes will begin, causing solenoid 92 to be energized, so that its armature 93 moves gang switch G, to move arm 94 off stop 97 and onto contact 91, as well as move arm 95 off contact 91 and onto contact 96. The result of this movement of gang switch G is two-fold. First, it connects contact 91 to solenoid 65 through wire 125, wire 88, switch 37 and wire 68, while contact 91 is connected through wire 90, a wire 126, a capacitor 127 and a resistor 128 connected in parallel, to lead 81. A rectifier 129 is interposed in lead 81, so that a pulsating D.C. current is provided in this circuit, while capacitor 123 will maintain a voltage across the clock circuit, so that the pulse does not depend solely upon the current through rectifier 129, thereby prolonging the life of the rectifier.

A contact 130 for switch 37 is also interposed in lead 81, for a purpose described below. Energization of coil 65 will cause sweep arm 42 to advance from contact 46a to contact 46b and cause sweep arm 43 to advance from contact 48a to contact 48b. Thus, solenoid 13b in branch line 11b will be energized to open valve 12b, while disconnected solenoid 13a then allows valve 12a to close, to terminate sprinkling through branch line 11a.

The second event which occurs upon movement of gang switch G is that capacitor 20 is recharged. This is accomplished by completing the capacitor circuit through wire 106, a rectifier 132, contact 96 and arm 95 of gang switch G to lead 79. The opposite side of the capacitor 20 is, of course, connected by wire 105 to lead 67. As capacitor 20 begins to charge, the negative bias on screen grid 115 will increase, so that vacuum tube 21 no longer conducts. However, the length of time this circuit is closed is controlled by the choice of the value of capacitor 120, which in turn determines the length of time solenoid 92 is energized to maintain gang switch G in this position. Thus, this value is chosen to allow ample time for capacitor 20 to recharge. When this happens, the gang switch G will return to the position shown in FIG. 3, but since solenoid 13b has previously been energized, branch 11b is watering.

Each of solenoids 13a, 13b, 13c, 13d and 13e are connected by a common wire 133 and a wire 134 to lamp 39, with which a fusible resistor 135 is connected in parallel, then through a wire 136 to arm 26 of cycling switch C. Warning lamp 39 normally burns rather dimly, but if there is a short in the windings of solenoid 13a or any of the other valve solenoids then in use, it will burn more brightly, due to the decreased resistance in the circuit, so that one will be aware that the solenoid is faulty and should be repaired or replaced. If the circuit becomes overloaded, fusible resistor 135 will blow out, which will overload lamp 39, causing it to burn out and create an open circuit which will be evident, since the indicating light 39 will not be illuminated. This open circuit will also cause the respective solenoids 13a to 13e to become inoperative and the respective branch line to be shut off, thus giving an outside visual indication through cessation of sprinkling.

In order to reset stepper switch S at a desired time, arm 25 of stepper switch C is connected by a wire 137 to a reset coil 138, with a branch wire 139 to contact 35g of stepper switch S. Reset coil 138 is associated with a reset armature 140 and is connected at its opposite end to wire 102. So that stepper switch S will be advanced when relay R is reset, a stepping solenoid coil 142 of stepper switch S, associated with an armature 143, is connected between the opposite ends of wires 144 and 145, the latter being connected to lead 80, so as to be in the same circuit as solenoid coil 72, while reset switch 36 is connected by a wire 146 to wire 144 and normally open reset button switch 40 is connected across wires 102 and 144, as shown. Advantageously, the mechanical construction of stepper switch S may be similar to that of the lower half of relay R, as in FIG. 2.

During the time that solenoid 13a of branch line 11a is energized, so that the branch line is sprinkling, the circuit from center tap 78 and lead 67 to the sprinkling line solenoid 13a comprises transfer wire 103, a portion of wire 102, wire 52, sweep arm 42, contact 46a and wire 56a. When cycling switch C is in the position shown in FIG. 3, the circuit is completed from arm 26 through contact 28a, contact 35a and arm 34 to lead 80, with a similar circuit for each of solenoids 13b to 13e. As the arms 42 and 43 of relay R advance from contact to contact, the respective solenoids 13b and 13c will each be turned on, in turn, to maintain the water on in the respective lines 11b and 11c, until condenser 20 discharges, in each instance, to cause gang switch G to shift and advance relay R and arms 42 and 43 to the next station. However, when arm 42 of relay R reaches contact 46d, at which reset switch 36 is set in FIG. 3, as indicated in FIG. 1, reset coil 72 of relay R will be energized through sweep arm 42 and wire 146, to reset arm 42 to contact 45, so that the cycle will not be repeated until clock 38 again closes switch 84 on contact 86. It will be noted that, if switch 36 is set for contact 46e, four lines will be watered before relay R resets, while if switch 36 is set on contact 46f, five lines will be watered before relay R resets. As indicated previously, more than five lines may be controlled, with contacts corresponding to 46a through 46f provided for the respective lines, with a starting contact corresponding to contact 45 and a terminal, non-watering contact corresponding to contact 46f provided. Of course, the number of rheostats corresponding to rheostats 15 to 19 will also be increased to correspond with the number of lines to be controlled.

When solenoid 72 is energized to reset relay R, solenoid coil 142 will also be energized, thereby activating armature 143 to advance sweep arm 34 of stepper switch S from contact 35a to contact 35b. It will be noted from FIG. 1 that cycling switch control 24 is adjusted to the number one position, i.e. for watering every day, which corresponds to the position of arms 25 and 26 of FIG. 3. With switch C in the position of FIG. 3, when arm 34 of stepper switch S advances to contact 35b, connected to contact 28b, since arm 25 is in engagement with contact 27a, the circuit through reset coil 138 will be completed through wire 29 and wire 137, so that stepper switch S, upon energization of reset coil 138, will be returned to its initial position on contact 35a, and the entire operation will be repeated when clock 38 again closes switch 84.

Figure 4:
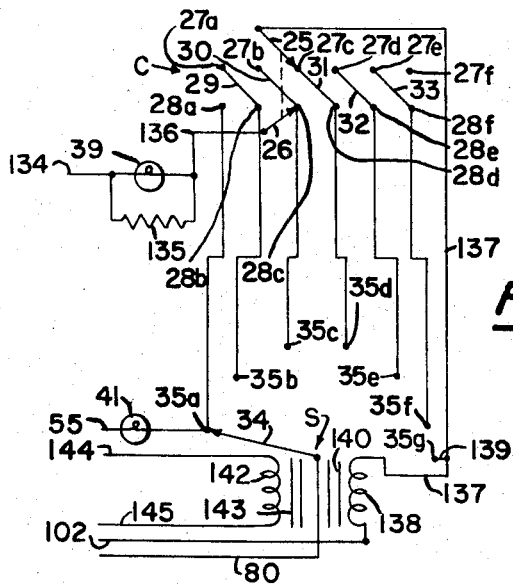
FIG. 4 is a fragmentary portion of the circuit diagram of FIG. 3, showing the reset switch set for cycling every third day.

In FIG. 4, cycling switch C is shown positioned for watering every third day, corresponding to switch 24 being set on the No. 3 position of FIG. 1, or arms 25 and 26 in engagement with contacts 27c and 28c, respectively. Thus, it can be seen that the circuit through solenoids 13a to 13f is broken until sweep arm 34 is advanced to contact 35c, since arm 34 must be on a contact 35a, 35b, etc., corresponding to a contact 28a, 28b, etc., engaged by arm 26 of switch C, for any of the solenoids 13a to 13e to be energized. Of course, the system goes through the same timing cycle, as though watering were being done, but without turning on any water, i.e. relay R advances in the usual manner and then returns to its initial position, advancing arm 34 one contact for each cycle of relay R. Thus, each day relay R will move through its respective positions until it reaches the position of reset switch 36, at which time solenoids 72 and 142 will be energized, returning relay R to its initial position and advancing sweep arm 34 to the next contact. This will continue until sweep arm 34 is advanced to contact 35c, completing the watering circuit. Thus, on the third day, watering will take place as relay R advances through its steps, since the circuit to solenoids 13a to 13e will be completed through arm 34. At the end of watering on the third day, sweep arm 34 will be advanced to contact 35d, completing the circuit through cross wire 31 to release solenoid 138 and causing sweep arm 34 to return to contact 35a, so that the entire three day cycle begins again the following day. When sweep arm 34 engages contact 35a, light 41 will be lit indicating the beginning of a new cycle. Of course, at all other positions of sweep arm 34, the light 41 will be out.

It will be noted that cross wires 29 to 33 permit arms 25 and 26 of cycling switch C to be advanced concurrently to corresponding contacts, but permit watering when arm 34 reaches a contact corresponding to that on which arm 26 is set, but will cause switch S to be reset when arm 34 reaches the next contact, corresponding to the cross wire which connects the next contact with the contact on which arm 25 is set. Thus, if arms 25 and 26 are set on contacts 27b and 28b, respectively, corresponding to switch control 26 of FIG. 1 being placed at the No. 2 position, watering will take place every other day. The setting of arms 25 and 26 on contacts 27c and 28c, respectively, has been described above in connection with FIG. 4. Similarly, when arms 25 and 26 are set on contacts 27d and 28d, respectively, watering will take place every fourth day, while if on contacts 27e and 28e, respectively, watering will take place every fifth day. Similarly, if arms 25 and 26 are set on contacts 27 and 28f, watering will take place on every sixth day, when arm 34 reaches contact 35f, while at the end of the watering cycle, arm 34 will move to contact 35g to cause coil 133 to be energized through wire 139 and a portion of wire 137, thereby returning arm 34 to contact 35a.

In the event that watering is to take place twice each day, but on every other day only, clock 38 is provided with an additional tab for closing switch 84 both at a desired time in the morning and a desired time in the evening, for instance, while cycle switch C is provided with an additional arm corresponding to arm 26, similarly connected to wire 136 and spaced from arm 25 the distance of one contact. The arms 25 and 26 are set on contacts 27d and 28d, respectively, while the additional arm corresponding to arm 26 is set on contact 28c, so that when arm 34 engages contacts 35a and 35b, on the morning and evening of the first day, no watering will take place, but when arm 34 engages contact 35c, the second morning, watering will take place, as well as in the evening, when arm 34 is in engagement with contact 35d. However, when arm 34 moves to contact 35e, at the end of the watering cycle on the second evening, switch S will reset, so that no watering will take place the third day. If watering is to be started the first day, switch S may be advanced manually through two positions, as described below, so that arm 34 will be in engagement with contact 35c when clock 38 first closes switch 84.

Sometimes it is desirable to set the positions of the relays manually, particularly if the preset watering cycle sequence is to be changed. Thus, if it is desired that relay R be advanced manually, this can be done by momentarily closing, as many times as necessary, switch 37 to the dotted position against contact 130 in lead 81, which will connect coil 65 between leads 67 and 81. Of course, if it is desired to skip one line, the rheostat therefor may be set to zero, as shown in the case of rheostat 18 of FIG. 1, while if additional watering time for one or more lines on a particular day is desired, the particular rheostat involved may be advanced at any time before that line starts watering. Also, stepper switch S can be advanced, as when cycle switch C is set so that one or more watering cycles are to be skipped and watering on the first day or the next cycle is desired, or relay R has been manually controlled and a resetting of switch S is necessary to continue the previous cycle, by momentarily closing reset button 40, which is connected across wires 102 and 144, as indicated previously.

From the foregoing, it can be seen that the objects and requirements hereinbefore set forth have been fulfilled to a marked degree. An automatic sprinkling system has been provided in which the various branch lines may be set to operate sequentially at different periods of time or one or more branches may be excluded from the watering cycle, if desired. In addition, the period of the watering cycle may be varied; that is, the watering may be done every day, on alternate days, every third day and so on. The cycle switch C cooperates with the stepper switch S to permit the omission of watering at desired periods to be accomplished readily. The amount of time each branch line is operative may also be readily readjusted, even during operation, and this is determined by the discharge rate of a capacitor which is connected in a circuit with a variable resistor, whose resistance may be changed in accordance with the desired discharge rate. This capacitor varies the bias on the screen grid of a vacuum tube in the circuit, or the equivalent element of a transistor, so that it is either conductive or nonconductive. Watering takes place when the tube is nonconductive but the relay is advanced when the tube is conductive.

Although a preferred form of this invention has been illustrated and described, it will be understood that various changes and variations may be made without departing from the spirit and scope of this invention.

What is claimed is:

1. A timing control for intermittently energizing the drive means of a sequential coupler in apparatus having a plurality of electrically actuated control members, such as solenoid valves, in an automatic lawn sprinkling system, wherein said coupler includes a switch arm and a plurality of sequence terminals connecting with control members of the apparatus, with the switch arm being adapted to step over the terminals as the drive means is intermittently energized, said timing control comprising in combination therewith:

a second sequential coupler having a switch arm, a plurality of sequence terminals and drive means adapted to move the switch arm thereof in unison with the switch arm of the first said coupler;

a pulser circuit having a control device for intermittently supplying pulses to said drive means to move the switch arm of each coupler from one terminal to the next, said control device including gate means adapted to prevent the flow of current whenever the gate means is charged but to permit the flow of current whenever the gate means is discharged;

a timer circuit connected with the gate means and including a capacitor which is charged to prevent the flow of current through said pulser circuit and is discharged to permit the flow of current through said pulser circuit;

means for charging the capacitor responsive to the flow of current through said pulser circuit;

discharge means adapted to slowly discharge the capacitor whenever the coupler switch arms are shifted to a terminal; and said discharge means including a resistor lead connected between each sequence terminal of the second said sequential coupler and said capacitor for connection in the timer circuit whenever the arm of a coupler contacts the corresponding sequence terminal, the resistance of each resistor lead being adjustable to effect discharge of the capacitor over a selected time interval.

2. In the timing control defined in claim 1, wherein said gate means comprises the grid of a vacuum tube in said pulser circuit.

3. In the timing control defined in claim 1, wherein said means for charging said capacitor includes a charging lead connected to the timer circuit and a normally open relay switch in the charging lead with the actuator coil of the relay being in the said pulser circuit means and adapted to be energized to close said relay switch whenever current is flowing through the said pulser circuit means.

4. In the timing control defined in claim 1, including a starting terminal on each sequential coupler where the arm of the coupler is positioned prior to operation of the control, a starter circuit connected to the starting terminal of the first said sequential coupler and to said drive means; and a normally open switch in the starter circuit which may be closed, as by a time clock means or the like, to energize said drive means and shift the arm of each coupler from its respective starting terminal to the next terminal in the sequence.

5. In the timing control defined in claim 4, including a charging circuit connected to the starting terminal of the second said sequential coupler and to the said timer circuit adapted to maintain the said timer circuit capacitor in a charged state when the arm of the second said sequential coupler is at the starting terminal.

6. In the timing control defined in claim 1, including a cutout switching means associated with the sequence terminals of the first said sequential coupler adapted to disconnect the sequence terminals from the control members of the apparatus to permit a complete sequential cycling of the timing control sequential couplers without effecting operation of the control members.

7. In the timing control defined in claim 6, wherein said switching means include a third sequential stepper means adapted to shift sequentially from one step to the next responsive to a complete cycle of movement of the first and second said sequential couplers and means at a selected step of the third said coupler means adapted to selectively permit or prevent operation of the control members during the operation of the first and second said sequential couplers with the third coupler operating at the selected step.

8. In the control circuit defined in claim 1, wherein each resistor lead includes a variable resistor and a second fixed resistor paralleling the variable resistor.

References Cited
UNITED STATES PATENTS

| | | | |
|---|---|---|---|
| 2,695,976 | 11/1954 | Hasenkamp | 317—142 X |
| 3,063,643 | 11/1962 | Roberts. | |
| 3,118,606 | 1/1964 | Rotunda | 239—70 X |
| 3,119,021 | 1/1964 | Podell et al. | 317—142 X |
| 3,140,720 | 7/1964 | Griswold. | |
| 3,200,303 | 8/1965 | Maxwell | 317—142 |

ORIS L. RADER, *Primary Examiner.*

T. B. JOIKE, *Assistant Examiner.*